US008883671B2

(12) United States Patent
Obenland et al.

(10) Patent No.: US 8,883,671 B2
(45) Date of Patent: Nov. 11, 2014

(54) MONOLITHIC CATALYST SYSTEM FOR THE PHOTOLYSIS OF WATER

(75) Inventors: Sigrid Obenland, Munich (DE); Christian Fischer, Pohlheim (DE)

(73) Assignee: CFSO GmbH, Greifenberg (DE)

( * ) Notice: Subject to any disclaimer, the term of this patent is extended or adjusted under 35 U.S.C. 154(b) by 1198 days.

(21) Appl. No.: 12/734,330

(22) PCT Filed: Oct. 31, 2008

(86) PCT No.: PCT/EP2008/009229
§ 371 (c)(1),
(2), (4) Date: Sep. 13, 2010

(87) PCT Pub. No.: WO2009/056348
PCT Pub. Date: May 7, 2009

(65) Prior Publication Data
US 2011/0220484 A1    Sep. 15, 2011

Related U.S. Application Data

(60) Provisional application No. 61/130,701, filed on Jun. 2, 2008.

(30) Foreign Application Priority Data

| Oct. 31, 2007 | (DE) | 10 2007 052 214 |
| May 21, 2008 | (DE) | 10 2008 024 472 |
| Sep. 18, 2008 | (DE) | 10 2008 047 821 |
| Sep. 24, 2008 | (DE) | 10 2008 048 737 |

(51) Int. Cl.
*B01J 31/00* (2006.01)
*B01J 23/00* (2006.01)
(Continued)

(52) U.S. Cl.
CPC ............ *B01J 35/0033* (2013.01); *B01J 21/063* (2013.01); *B01J 23/26* (2013.01); *B01J*
(Continued)

(58) Field of Classification Search
USPC .................. 502/150–173; 204/157.5, 157.52; 423/579, 647.7, 648.1, 657
See application file for complete search history.

(56) References Cited

U.S. PATENT DOCUMENTS 3,925,212 A * 12/1975 Tchernev ..................... 422/186
(Continued)

FOREIGN PATENT DOCUMENTS

| GB | 1581422 A | 12/1980 |
| GB | 2416778 A | 2/2006 |

(Continued)

OTHER PUBLICATIONS

Gao X Et Al: "Photoelectrochemical decomposition of water using modified monolithic tandem cells" International Journal of Hydrogen Energy, Elsevier Science Publishers B.V., Barking, GB, vol. 24, No. 4, Apr. 1, 1999, pp. 319-325.

*Primary Examiner* — Anthony J Zimmer
(74) *Attorney, Agent, or Firm* — Heribert Muensterer

(57) ABSTRACT

A monolithic catalyst system for the cleavage of water into hydrogen and oxygen comprises a first photoactive material capable by itself or together with an auxiliary material and/or an auxiliary catalyst when irradiated with light having a wavelength≥420 nm of generating oxygen and protons from water, and a second photoactive material capable by itself or together with an auxiliary material and/or an auxiliary catalyst when irradiated with light having a wavelength≥420 nm of reducing protons in water to hydrogen. The first and second photoactive materials are in electrical contact via an electron-conducting material.

16 Claims, 5 Drawing Sheets

STRUCTURE OF A PHOTOCATALYST SYSTEM USING THE Z SCHEME WHICH MIMICS THE PHOTOSYNTHESIS/PHOTOLYSIS OF WATER IN PLANTS/BACTERIA

(51) Int. Cl.
*B01J 35/00* (2006.01)
*B01J 23/26* (2006.01)
*C25B 1/00* (2006.01)
*C01B 3/04* (2006.01)
*B01J 31/18* (2006.01)
*B01J 23/652* (2006.01)
*B01J 27/045* (2006.01)
*B01J 31/22* (2006.01)
*B01J 21/06* (2006.01)
*B01J 23/52* (2006.01)
*B01J 23/42* (2006.01)

(52) U.S. Cl.
CPC ..... 35/0013 (2013.01); *C25B 1/003* (2013.01); *C01B 3/042* (2013.01); *B01J 31/1865* (2013.01); *B01J 35/0006* (2013.01); *B01J 23/6527* (2013.01); *B01J 27/045* (2013.01); *B01J 23/52* (2013.01); *B01J 31/1815* (2013.01); *B01J 2531/821* (2013.01); *B01J 2231/70* (2013.01); *B01J 2231/62* (2013.01); *B01J 31/2226* (2013.01); *Y02E 60/368* (2013.01); *B01J 23/42* (2013.01); *B01J 2531/72* (2013.01); *B01J 35/004* (2013.01); *B01J 2531/824* (2013.01); *B01J 2531/0216* (2013.01); *Y02E 60/364* (2013.01)
USPC ............................ 502/150; 502/300; 502/325

(56) References Cited

U.S. PATENT DOCUMENTS

| | | | | |
|---|---|---|---|---|
| 4,011,149 | A | * | 3/1977 | Nozik ............................ 205/340 |
| 4,090,933 | A | * | 5/1978 | Nozik ............................ 205/340 |
| 4,381,978 | A | | 5/1983 | Gratzel et al. |
| 4,461,691 | A | | 7/1984 | Frank |
| 4,643,817 | A | * | 2/1987 | Appleby ........................ 204/242 |
| 4,650,554 | A | * | 3/1987 | Gordon ......................... 205/340 |
| 4,656,103 | A | * | 4/1987 | Reichman et al. ............. 429/111 |
| 6,936,143 | B1 | * | 8/2005 | Graetzel et al. ................ 204/242 |
| 7,338,590 | B1 | | 3/2008 | Shellnut et al. |
| 7,750,234 | B2 | | 7/2010 | Deng et al. |
| 2005/0211290 | A1 | | 9/2005 | Deng et al. |
| 2010/0143811 | A1 | | 6/2010 | Brimblecombe et al. |

FOREIGN PATENT DOCUMENTS

| | | | |
|---|---|---|---|
| JP | 58125601 | A | 7/1983 |
| JP | S58125601 | | 7/1983 |
| JP | 2006265697 | A | 10/2006 |
| JP | 2006302695 | A | 11/2006 |
| JP | 2007528935 | A | 10/2007 |
| WO | 2004050961 | A | 6/2004 |
| WO | 2005007932 | A | 1/2005 |
| WO | 2008116254 | A | 10/2008 |

* cited by examiner

STRUCTURE OF A PHOTOCATALYST SYSTEM USING THE Z SCHEME WHICH MIMICS THE PHOTOSYNTHESIS/PHOTOLYSIS OF WATER IN PLANTS/BACTERIA

UV/VIS SPECTRUM OF TRIS[4-(11-MERCAPTOUNDECYL)-4'-METHYL-2,2'-BIPYRIDINE]-RUTHENIUM(II)-BIS(HEXAFLUOROPHOSPHATE)

Alkyl: $(CH_2)_{11}$

UV/Vis (MeOH):   $\lambda_{max}$ (lg ε) = 248.0 (0.36), 258.0 (0.35), 286.5 (1.27), 324.5 (0.20), 436 (Sh., 0.22), 457.5 (0.26).

CTK-3B

| nm    | ε     |
|-------|-------|
| 457.5 | 8940  |
| 324.5 | 6960  |
| 286.5 | 45000 |
| 258.0 | 12600 |
| 248.0 | 13200 |
| 222.5 | 22900 |

UV/VIS SPECTRUM OF [(2,2'-BIPYRIDINE)[4-(11-ACETYLTHIANYLUNDECYL)-4'-METHYL-2,2'-BIPYRIDINE]-RUTHENIUM(II)-[(TETRAPYRIDOPHENAZINE)-PALLADIUM(II)-DICHLORO]-BIS(HEXAFLUOROPHOSPHATE)

UV/Vis (CH$_3$CN):     $\lambda_{max}$ (lg ε) = 241.0 (1.34), 283.5 (0.56), 354.5 (sh, 0.10), 432.0 (0.08), 453.5 (0.08).

| nm | ε |
|---|---|
| 241.0 | 1.34 |
| 283.5 | 0.56 |
| 354.5 | 0.10 |
| 375.0 | 0.09 |
| 432.0 | 0.08 |
| 453.5 | 0.08 |

UV/VIS SPEKTRUM OF $Mn_4O_4(O_2PPh_2)_6$

Manganese-oxo-complex $Mn_4O_4(O_2PPh_2)_6$

M=1586.85 g/mole

UV/Vis ($CH_2Cl_2$): $\lambda_{max}$ (lg ε) = 229.0 (0.80), 263.0 (0.36), 257.0 (0.36), 269.5 (0.34).

| nm | ε |
|---|---|
| 269.5 | 0.343 |
| 263.0 | 0.364 |
| 257.0 | 0.362 |
| 229.0 | 0,802 |

MONOLITHIC CATALYST SYSTEM FOR THE PHOTOLYSIS OF WATER

CROSS-REFERENCE TO RELATED APPLICATIONS

The present application is a U.S. National Stage of International Application No. PCT/EP2008/009229, filed Oct. 31, 2008, which claims the benefit under 35 U.S.C. 119(e) of U.S. Provisional Application No. 61/130,701, filed Jun. 2, 2008.

BACKGROUND OF THE INVENTION

The invention relates to a catalyst system for the cleavage of water into hydrogen and oxygen with the aid of light and to a method of producing hydrogen and oxygen using the catalyst system.

PRIOR ART

Hydrogen is generally believed to become the material energy carrier of the future and thus there is a major interest in the environmentally friendly production of hydrogen without the concomitant production of carbon dioxide and without the use of conventional electrolysis which usually is expensive and often environmentally unfriendly.

In U.S. Pat. No. 6,936,143 B1 Graetzel et al. disclosed a tandem cell or photoelectron-chemical system for the cleavage of water to hydrogen and oxygen by visible light, both cells being connected electrically. This electrical connection involves an organic redox electrolyte for the transport of electrons from the photoanode, e.g. $WO_3$ or $Fe_2O_3$ to the photocathode, a dye sensitized mesoporous $TiO_2$ film. Although nothing is disclosed in this patent about the organic redox electrolyte, it is clear the very term itself involves an electron transport through ionic conduction, since electrolytes always transport charge thorough ions.

SUMMARY OF THE INVENTION

The present invention provides a monolithic catalyst system for the cleavage of water into hydrogen and oxygen with the aid of light, comprising a first photoactive material capable by itself or together with one or more of an auxiliary material and an auxiliary catalyst when irradiated with light having a wavelength≥420 nm of generating oxygen and protons from water, and a second photoactive material capable by itself or together one or more of an auxiliary material and an auxiliary catalyst when irradiated with light having a wavelength≥420 nm of reducing protons in water to hydrogen, the first photoactive material and second photoactive material being in electrical contact, particularly in direct electrical contact, via one or more electron-conducting materials.

Also provided is a method of generating oxygen and hydrogen from water with the aid of light and a catalyst system which is characterized in that a catalyst system in accordance with the invention is brought into contact with water or an aqueous fluid or solution at a first location comprising a first photoactive material or one or more of an auxiliary material and an auxiliary catalyst associated therewith or both and which is brought into contact with water or an aqueous fluid or solution at a second location comprising the second photoactive material or one or more of an auxiliary material and an auxiliary catalyst associated therewith or both and is then irradiated with light, the water or aqueous fluid or solution in contact with the first location and the water or aqueous fluid or solution in contact with the second location being in contact with each other such that protons can migrate from the first location to the second location.

Advantageous embodiments of the invention are recited in the dependent claims.

PRINCIPLE OF GENERATING HYDROGEN AND OXYGEN ACCORDING TO THE SO-CALLED Z-SCHEME

Figure 1:
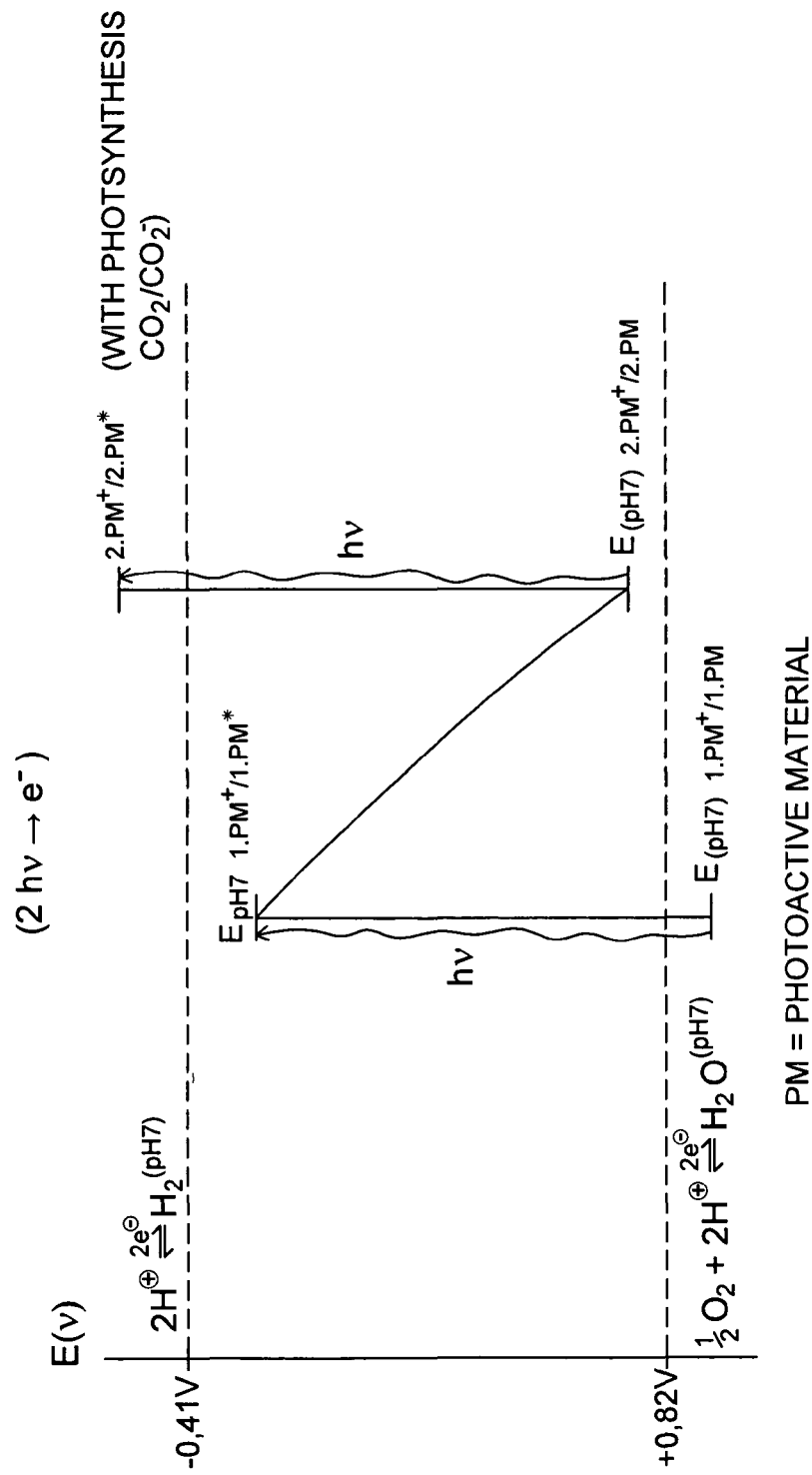
FIG. 1 depicts the so-called the Z scheme of photosynthesis or photolysis of water in plants or bacteria as used in the catalyst system in accordance with the invention.

The catalyst system of the present invention uses four photons for the cleavage of water into $½O_2$ and $H_2$. The various partial steps and how they relate by their energy levels are depicted diagrammatically in FIG. 1.

Required at the oxidizing side of the catalyst system (also termed first photoactive material hereinafter) are 2 photons for the following reaction $$H_2O + 2 \text{ photons} \rightarrow ½O_2 + 2H^+ + 2e^- \; (E_{O2/H2O(pH7)} = +0.82 \text{ V}).$$

This is the reaction that takes place in plants/bacteria in the so-called photosystem 2.

Required at the reduction side of the catalyst system (also termed second photoactive material hereinafter) are 2 photons for the following reaction $$2H^+ + 2e^- + 2 \text{ photons} \rightarrow H_2 \; (E_{H+/H2(pH7)} = -0.41 \text{ V}).$$

This is the reaction that may take place in some bacteria in the photosystem 1 in conjunction with the enzyme hydrogenase that generates hydrogen.

The net result of this reaction is:

$$H_2O + 4 \text{ Photonen} \rightarrow H_2 + ½O_2 \; (E_{pH7} = 1.23 \text{ V}).$$

What is involved is thus a process in which 2 photons (2 hv) are needed so that 1 e⁻ is removed from the oxygen in water and transferred to a H⁺ ion (2 hv→1 e⁻). This reaction is also termed Z scheme reaction according to photosynthesis in plants and bacteria.

The terms "hydrogen", "protons", "H⁺", "H⁺ ions" etc. in conjunction with the present invention are also intended to include the terms "deuterium", "deuterium ions", "D⁺", "D⁺ ions" etc. Likewise the term "$H_2$" is also intended to include "HD" and "$D_2$". However, the term "$D_2$" does not include "HD" and "$H_2$".

The electrons set free at the oxidation side of the catalyst system (in the terms of electrochemistry: the anode) in accordance with the invention are conducted directly to the reduction side of the catalyst system (in the terms of electrochemistry: the cathode) via one or more electron-conducting materials. Ion conductors, fluid redox electrolytes and solid electrolytes are not included in the term "electron-conducting material". Electron conduction through junctions such as a p-n junction is not considered to involve an electron conducting material between a first and a second photoactive material in the sense of the present invention.

The invention imitates the Z scheme of plants and bacteria also in regards to the direct electron conduction between the two photoactive materials. Thus, it truly artificially mimics photosynthesis in plants and bacteria or, more precisely, the photolysis of water in some bacteria, i.e. can truly be considered to achieve artificial photosynthesis.

Of course, no external voltage has to be applied to the system in order to function.

A monolithic catalyst system in this application is understood to be a system which is compact and has no structures such as macroscopic wires, conductors or electrodes extending from the system and not compactly integrated therein, e.g. no electrodes which are connected to the system via a conductive wire, band or sheet or the like. Such a monolithic system may take the form of a plate, a film or also a tube. "Monolithic" is not intended to mean that the system is necessarily fabricated as a single piece.

A "photoactive material" is understood in this patent application to be a material which together with a further photoactive material shows a redox potential scheme corresponding to the Z scheme of the photosynthesis/photolysis, the total potential difference of which is sufficient to permit cleavage water into hydrogen and oxygen when the photoactive materials are irradiated with light having a wavelength≥420 nm, preferably ≥430 nm, more preferably ≥440 nm and particularly ≥450 nm. Furthermore, preferably one or both of the photocatalysts should not exclusively absorb electromagnetic radiation at wavelengths ≥700 nm.

As evident from the Z scheme (see FIG. 1) the redox potentials of the first and second photoactive material comprise the following redox potentials and redox potential relationships:
1. The redox potential of the ionized state of the first photoactive material and the redox potential of the positively charged valence band of the first photoactive material, respectively, is more positive than +0.82 V.
2. The redox potential of the excited state of the second photoactive material and the redox potential of the conduction band of the second photoactive material, respectively is more negative than −0.41 V.
3. The redox potential of the excited state of the first photoactive material and the redox potential of the conduction band of the first photoactive material, respectively, is more negative than the redox potential of the ionized state of the second photoactive material and the positively charged valence band of the second photoactive material, respectively.

The redox potential of the non-excited state of the first photoactive material and of the valence band of the first photoactive material, respectively, is, as a rule more positive than the redox potential of the non-excited state of the second photoactive material and of the valence band of the second photoactive material, respectively. Since the catalyst system is required to work with visible light having a wavelength ≥420 nm, the excited states and the conduction bands, respectively, of the photoactive materials must permit being generated or occupied with the aid of light of such a wavelength.

The term "a first photoactive material" (which in the terms of electrochemistry is the anode of the photocatalyst system or forms part thereof) and "a second photoactive material" (which in the terms of electrochemistry is the cathode of the photocatalyst system or forms part thereof) is understood to also mean a plurality (or a mixture) of first photoactive materials and second photoactive materials, respectively.

A variety of materials, both in the form of non-molecular solids as well as molecular and polymer compounds, is known which may serve as the first photoactive (oxidation-promoting) material and work in light having a wavelength≥420 nm. The first photoactive (oxidation-promoting) material may, however without being limited thereto, comprise an optionally doped oxide- and/or sulfide-containing material, in particular $RuS_2$, complexes or clusters containing a noble metal or an transition metal, and photoactive polymeric materials. For example and without limitation, use may be made of $RuS_2$ which may be doped, $WO_3$, which may comprise a noble metal, an iron oxide, which may be doped with foreign atoms, $TiO_2$ doped with Sb/M (M=Cr, Ni and/or Cu), a $Mn_4$ cage complex, a $Ru_4$ cluster complex, a $Ru^{3+}$ complex and the specific photoactive materials described in examples 1, 2 and 3 of the present application.

It is often the case that the individual mechanistic steps resulting in release of electrons from the oxygen of water are not known precisely. But in any case an electronically excite state is created with the aid of a photon having a wavelength≥420 nm, the excited electron when spatially separated from the first photoactive material leaves behind therein an oxidation state elevated by 1 or a hole which is filled by an electron of the oxygen of the water so that ultimately $O_2$ and protons are generated, it often being the case that also 2, 3 or 4 (additional) positive charges or holes are generated simultaneously.

To facilitate development of oxygen the first photoactive material may be associated with an auxiliary material and/or catalyst which itself is not a photoactive material as defined above, it instead promoting oxygen development without being able to develop oxygen by itself under irradiation. Such auxiliary materials and/or catalysts are without limitation e.g. $RuO_2$, certain noble metals, such as palladium or platinum, or a compound formed in situ from cobalt metal and a phosphate in water.

In use of the catalyst system either the first photoactive material or the auxiliary material and/or catalyst, where existing, or both are in contact with water.

For the second photoactive (reduction promoting) material too, a wealth of materials exists, both in the form of non-molecular solids as well as solid molecular and polymer compounds which absorb in the wavelength range ≥420 nm, all of which may be used. For example, such a material may be one of the many ruthenium(II) complexes most often complexed with nitrogen-containing ligands, of which it is known that they when excited with light of a wavelength≥420 nm can reduce protons in water (more precisely hydronium ions; often briefly termed herein as "$H^+$") to $H_2$, usually in conjunction with a common catalytic species which when supplied with electrons can reduce protons to hydrogen, e.g. Pd or Pt. Many other metal-containing complexes too, e.g. noble metal complexes, natural chlorophyll (with Mg as the central atom), Cu-chlorine and Cu-2-α-oxymesoisochlorine or other metal-containing phthalocyanines or metal-containing porphyrines or purely organic compounds having an extended π system, such as among others $H_2$-chlorine and proflavine exhibit excited states when irradiated with visible light which have sufficient energy to permit reduction of $H^+$ to ½$H_2$ where necessary with further conductive transfer of the excited electrons causing charge separation to a suitable auxiliary material or catalyst (e.g. Pd, Pt, Ru or a zinc-containing species).

Also a great variety of (where necessary doped) oxide- and oxynitride-containing materials, and, although usually less preferred, phosphide-, arsenide-, antimonide-, sulphide- and selenide-containing materials (e.g. $SrTiO_3$ doped with Cr/Sb or Rh, $ZnIn_2S_4$, TaON and $NiM_2O_6$ (M=Nb, Ta) can generate $H_2$ from water (where necessary in the presence of an auxiliary material or catalyst such as Pt, Pd or Ru) when irradiated with light ≥420 n nm. In addition, photosemiconducting polymers can employed exhibiting, where necessary in conjunction with a further organic non-polymer material, photovoltaic properties.

Exemplary specific photoactive materials are described in examples 3, 4 and 5 of the present application.

When employing the photocatalytic system of the invention likewise either the second photoactive material or the corresponding auxiliary material or catalyst, if present, or both are in contact with water.

In accordance with the invention the first photoactive material is preferably not the complete photosystem 2, possibly modified, of plants or bacteria, (which thereby split water into oxygen and protons). It preferably particularly does not comprise polypeptides or proteins. The reason is that the natural photosystem 2 is very unstable.

In accordance with the invention the second photoactive material it is presently preferred not to be the complete photosystem 1, possibly modified, of plants or bacteria (which thereby convert (reduce) $NADP^+$ into $NADPH^+H$ or reduce protons to hydrogen by the aid of hydrogenase in special cases). It preferably particularly does not comprise polypeptides or proteins. The reason is that hydrogenase is very sensitive to oxygen and that it might be difficult to couple different auxiliary catalysts for the reduction of protons to the complete photosystem 1.

Although in principle useful, the first photoactive material is preferably not a single crystal or derived therefrom by doping. Single crystals, doped crystals grown by epitaxy and the like are expensive to manufacture.

Fro the same reason the second photoactive material is preferably not a single crystal or derived therefrom by doping, though such material is useful in principle.

It further is preferred that neither of the photoactive materials is doped silicon, since this material is also expensive.

Preferably in the present invention, not both photoactive materials i.e. either the first photoactive material or the second photoactive material, are conventional semiconductors or photosemiconductors used in photovoltaics, such as III-V semiconductors, II-VI semiconductors or II-V semiconductors or III-VI semiconductors or similar semiconductors that may include mono-, di- and/or trivalent cations of the transition metals and group Va and VIa anions of the periodic table of elements. It is furthermore preferred that none of the two photoactive materials is selected from the above-mentioned semiconductors. Such semiconductors are in principle useful, however they often are expensive, include metals that are environmentally harmful and/or are not stable in the presence of water and in that case may develop poisonous gases.

Preferably the combination of the first and second photoactive materials is not a combination of a semiconducting oxide absorbing the blue and green portion of the solar emission spectrum and of a mesoporous photovoltaic film using the yellow, red and near infrared portion of the solar emission spectrum for proton reduction, as long as the two materials are arranged in sequence so that yellow, red and near infrared light not absorbed by the first photoactive material is transmitted to the second photoactive material. Such an arrangement usually requires a specific tandem cell built for the cleavage of water which is not preferred in the present invention.

Preferably the first photoactive material and the second photoactive material are different chemical species and furthermore preferably do not consist of the same elements.

The first and second photoactive material can be combined in accordance with the Z scheme (see above).

When the second photoactive (reduction-promoting) material is irradiated with light an electron thereof moves to an excited state from which—when the energy is sufficient—it is transferred to protons in the water (often with the aid of an auxiliary material or catalyst, e.g. Pt or Ru) resulting in hydrogen and a photoactive reduction-promoting material or second photoactive material with a hole or an oxidation state elevated by 1, respectively.

The cycle is closed by an excited electron from the first photoactive material reduces the oxidized second photoactive material.

In one concrete case by way of example of a suitable Ru(II) complex when excited, can transfer its electron (where necessary via an auxiliary material and/or catalyst) to a proton and becomes itself oxidized into the Ru(III) complex which can abstract, via an electron-conducting material, an electron from a suitable excited oxidation-promoting material, e.g. $RuS_2$, thereby closing the electrical circuit for cleaving water. The pH of the water remains constant, since resulting protons are reduced continuously.

To avoid a radiating or radiationless deactivation or electron hole recombination of the excited first and second photoactive material it may be wanted to provide an adjacent electron acceptor material effecting an as much as possible irreversible charge separation which, where necessary, can relay the charge (the electron). Such a material may involve without being restricted thereto e.g. nanocrystalline titanium dioxide or $In_2O_3$ doped with tin, an organic acceptor compound, such as a quinone or methyl viologen, gold or a further complex compound which can relay electrons e.g. via molecular wires.

In the context of this invention an auxiliary material and/or catalyst is defined as a material which either promotes the transfer of electrons from oxygen (e.g. $RuO_2$, Pt, or a compound formed in situ from cobalt or a cobalt containing compound and a phosphate) to the first photoactive material, optionally via a conducting or semiconducting material, or the transfer of electrons from the second photoactive material to protons, optionally via a conducting or semiconducting material (e.g. Au, Pt or Ru). However, it is not photoactive itself, i.e. it is unable to effect cleavage of water without an additional photoactive material.

Electron conduction in the catalyst system in accordance with the invention can be effected with all known electron-conducting materials. Electron-conducting materials are e.g. metals, alloys, semiconductors, conductive oxides, conductive polymers, but also so-called molecular wires (e.g. carbon or hydrocarbon chains or generally covalent bound branched or unbranched chains in a wealth of differing structures which may comprise one or more functional groups and exist in the form of substituents of a chemical compound or independently therefrom and are capable of conducting electrons) or so-called nanowires, ["wires" having a diameter of the order of a nanometer ($10^{-9}$ meter) including metallic (e.g. Ni, Pt, Au), semiconducting (e.g. Si, InP, GaN etc) and in the macroscopic state isolating materials (e.g. $SiO_2$, $TiO_2$), as well as molecular nanowires composed of repeating units of either an organic (e.g. DNA) or inorganic nature (e.g. $Mo_6S_{9-x}I_x$). The electrons may also hop from molecule to molecule in certain material combinations.

In organic compounds or in ligands of complexes one or more of the functional groups thereof may be an optionally protected thiol group and the electron-conducting material to which the optionally protected thiol groups are bound may comprise gold.

For instance, electron conduction from a first to a second photoactive material may take place via the sequence: nanocrystalline titanium dioxide/indium tin oxide (ITO)/copper/gold/molecular wire. Other sequences are conceivable. The electrons from the second photoactive (reduction-promoting) material can likewise be transferred to the proton or hydroniumion by different ways and means. Electron conduction up to the proton may involve an auxiliary catalyst, in which case further electron-conducting material(s) may exist between the second photoactive material and the auxiliary catalyst.

Preferably the conducting material does not exclusively comprise organic molecules or complexes of the kind as is to be found in the natural photosynthesis system.

"Electrical contact" or "direct electrical contact" in conjunction with the present invention means material being in electrical contact exclusively via one or more electron-conducting or relaying materials in the solid state, but not via other materials such as ion conducting materials in a fluid or solid medium or liquid redox electrolytes or solid electrolytes.

When the first (oxidation-promoting) or second (reduction-promoting) photoactive material is an organic molecule or a complex with organic ligand(s) the conduction between the two photoactive materials usually includes an electron transition from an organic to an inorganic material or vice-versa, in the special case of a complex from the central atom of the complex via the ligand(s) to the conductive material or from the conductive material via the ligand(s) to the central atom of the complex.

This is usually no problem in the transition of an electron from the central atom to the ligand, and substituent(s) of the ligand are selected so that they are molecular wires. But the transition of an electron from the ligand or its substituent(s) for example to an inorganic conductor does not occur directly. Here, good results have been attained by introducing functional groups on the ligand or at the end of a ligand substituent capable of interacting with the inorganic material so strongly that electron conduction is possible. A prime example thereof is binding thiols to gold surfaces, although there is a wealth of other such interactions, e.g. those of phosphonic acids, carbon acid anhydrides or silanes to inorganic oxides (see e.g. an review thereof in the article by Elena Galoppini "Linkers for anchoring sensitizers to semiconductor nanoparticles" Coordination Chemistry Reviews 2004 248, 1283-1297).

A complex being the second photoactive material may comprise at least two functional groups, of which at least one is bound to the electron-conducting materials and the other is bound to a further electron-conducting material comprising a chemical species which can reduce protons into water when electrons are supplied.

Some photoactive materials, especially reduction-promoting complexes, are unstable in the simultaneous presence of light, water and oxygen. The present invention proposes a way of avoiding such instability by "casketizing" such, material in a transparent inorganic "casket" with the exclusion of water and oxygen, e.g. in a thin transparent "gold casket" with insulating sidewalls. In the latter case e.g. a reduction-promoting complex may comprise at least two functional groups, e.g. thiol groups, one of which, as explained above, serves to ensure electron conduction via the "floor" of the "casket" to the oxidation-promoting photoactive material, and the other serves to provide the conduction e.g. to an alloy type of material, e.g. gold/platinum (the "casket lid") that catalyzes the production of hydrogen with the aid of the excited electrons released from the central atom of the complex which are relayed via molecular wires to this alloy-type material. It will, of course, be appreciated that other such "casket" or "sandwich" structures are equally suitable.

The first (oxidation-promoting) photoactive material and the second (reduction-promoting) photoactive material may be mounted on or otherwise connected with one or more substrates, e.g. by physical deposition or some kind of by chemical bonding. The substrate may also be coated with an electrically conductive material, on which or with which the first (oxidation-promoting) photoactive material and the second (reduction-promoting) photoactive material may be mounted or otherwise connected, e.g. by physical or chemical deposition or some kind of by chemical bonding. The substrates may be electrically and photo-chemically inert, or not, and may be transparent or translucent (for instance glass) to permit the passage of light not absorbed by the photoactive material directly irradiated, or not. Non-limiting examples for the material of the substrate are optionally coated glass, ceramics, metal or metal alloys, semimetals, carbon or materials derived from carbon and all kinds of inorganic and organic polymeric materials.

With the aid of such a substrate a plane, e.g. plate-shaped, or also a tubular or otherwise appropriately shaped catalyst system can be constructed, e.g. with the photoactive oxidation-promoting material on one side and the photoactive reduction-promoting material on the other side, but also, when suitably structured, also with both materials on the same side. When the substrate is transparent or translucent it may be sufficient to irradiate one side of a plate-type catalyst system to also supply light to the photoactive material at the other side.

When a plane catalyst systems having the photoactive materials on opposite sides, for instance when plate-shaped, are immersed in an aqueous fluid, hydrogen is generated on one side and oxygen on the other. The way in which this is achieved already makes for hydrogen and oxygen being separated spatially, greatly diminishing the risk of an oxygen-hydrogen reaction. Totally separating the hydrogen from the oxygen is achievable by engineering the two photoactive materials totally separated from each other spatially, as is possible by compartmenting a reactor or reactor system into two chambers or into 2-chamber systems by means of a material exclusively permeable for protons and water (e.g. a Nafion® membrane). Protons must be able to drift to and fro between both chambers to compensate the charge.

The aqueous fluid into which the plane e.g. plate-type catalyst system of the present invention is immersed is normally water which may contain, depending on the case concerned, all kinds of soluble salts, acids or bases, but not by necessity. And, of course, e.g. mixtures of solvents and surfactants and the like soluble in water and, where necessary, watery emulsions and the like not involved in the photolysis reaction are a possible medium should it prove necessary, as long as the photolysis of the water is not disturbed or prevented thereby.

In the method of the invention the light used for irradiating the catalyst systems is preferably sunlight.

Furthermore, the first location and the second location irradiated are preferably separated from each other by a membrane permeable only for protons and water, e.g. a Nafion® membrane.

Only the first location of the catalyst system may be directly irradiated with light e.g. If the system is sufficiently transparent or partly transparent. Alternatively, only the second location may directly irradiated with light. In many cases, both locations are directly irradiated with light.

Oxygen and/or hydrogen evolving from water with the aid of the catalyst system and light may be intermittently or continuously collected.

The photocatalyst system in accordance with the invention has many advantages. Hydrogen and oxygen can be generated separately without production of oxygen-hydrogen gas. The system does not take the form of a powder but is monolithic, e.g. in the form of a plate which is simply immersed in an aqueous medium, requiring often no addition of any salts, acids or bases (although this is not excluded) which possibly add to the cost or environmental load of the method, all without the need of any special cells needing to be pressurized or involving a redox electrolyte which has to be encapsulated solvent-proof. The system is extremely flexible, featuring a large choice of water oxidizing catalysts (first photoactive materials) and water (or protons) reducing catalysts (second photoactive materials) enabling suitable combinations to be tailor-made.

Structure of an Exemplary Catalyst System

Figure 2:
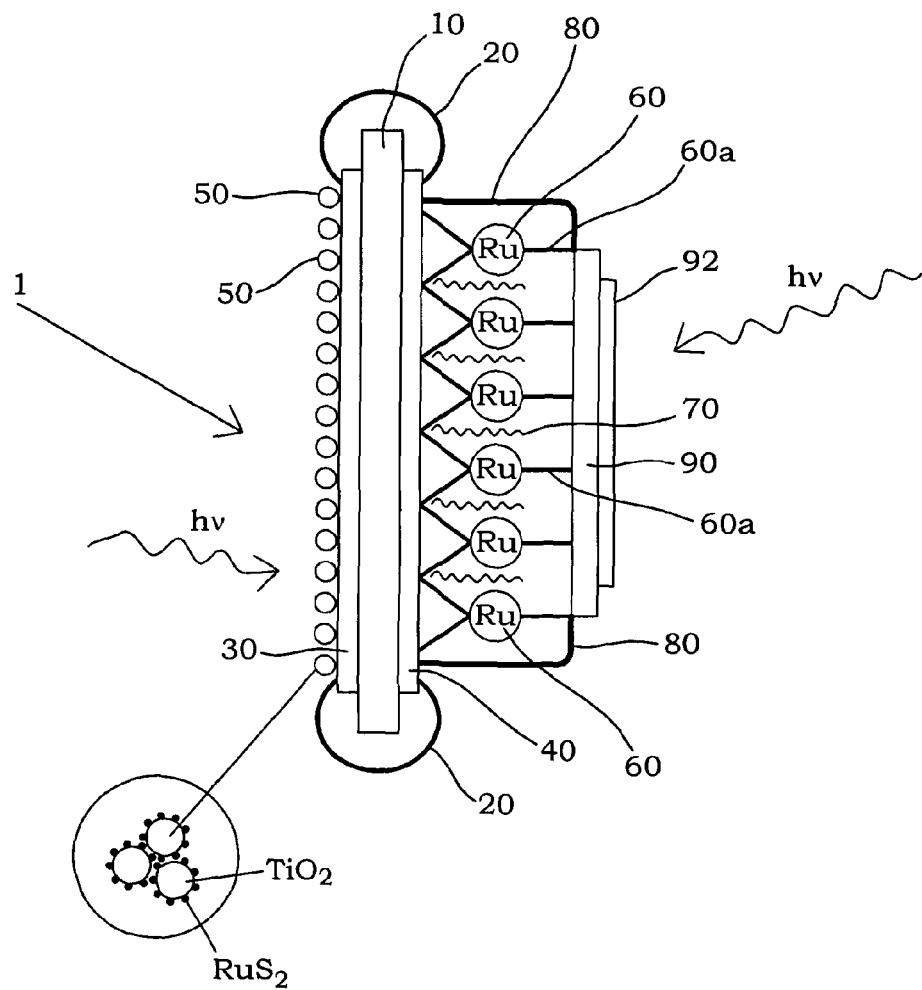
FIG. 2 depicts a diagrammatic cross-section through an example of a catalyst system in accordance with the invention.

FIG. 2 depicts a diagrammatic cross-section through the configuration of a photocatalyst system 1 working analogously to the Z scheme, which features on one side of an inert plate-type substrate 10 a transparent conductive layer coated with indium doped tin oxide (ITO) 30, on the other side a transparent layer of gold 40. The ITO layer 30 and gold layer 40 are electrically connected by copper bands 20.

Sintered on the ITO layer 30 is nanocrystalline $TiO_2$ 50 coated with $RuS_2$. Provided on the gold layer 40 is a monolayer of a ruthenium complex 60 (depicted far too thick) with three mercaptoalkyl substituents 60a (see example III.2.b) and an alkylthiol 70. The edges of the monolayer are framed on all sides by a resist 80 extending over the edge of the monolayer and covering the monolayer with a narrow band of resist. Vacuum deposited on the monolayer of the ruthenium complex 60 and alkylthiol 70 is a transparent thin gold layer 90 comprising just a few layers of gold and extending beyond the resist 80. Over the gold layer 90 a platinum layer 92 with fewer atoms of platinum than of a monolayer is deposited.

When the catalyst system as shown in FIG. 2 is immersed in water and irradiated with light having a wavelength≥420 nm electrons originating from the oxygen atoms of the $H_2O$ which has been oxidized to $\frac{1}{2}O_2+2H^+$ migrate from the $TiO_2$ 50 coated with ruthenium disulfide via the ITO layer 30 and copper bands 20 to the gold layer 40. Since the ruthenium complex 60 on being irradiated has given off an electron to an $H^+$ an electron migrates from the ruthenium complex 60 via the thiol group and the alkyl chain of the mercaptoalkyl substituents 60a of the ruthenium complex 60 to its Ru central atom. Irradiation of the ruthenium complex 60 causes it excitation to give off an electron to the gold layer 90 coated with platinum 92 via the alkyl chain and the thiol group of a further mercaptoalkyl substitute 60a and from there via the platinum 92 to a proton ($H^+$) in water which is reduced thereby to $\frac{1}{2}H_2$.

EXAMPLES

The invention is further illustrated by the following non-limiting examples.

Example 1

A. Preparation of a Oxidation-Promoting First Photoactive Material on $TiO_2$ in the Form of a 5% Suspension of $TiO_2/RuS_2$ (2% by Weight $RuS_2$ Relative to $TiO_2$)

Five grams of an aqueous $TiO_2$ suspension (10%, Aldrich) are diluted with 15 ml water and added with 23 mg (0.11 mmol) ruthenium(III)-chloride ($RuCl_3$), treated in an ultrasonic bath and concentrated under reduced pressure until dry.

The $RuCl_3$ deposited on the $TiO_2$ powder is firstly reduced to the metal (Ru) under an inert gas atmosphere in a stream of hydrogen gas ($H_2$). For this purpose the samples are heated to 300° C. and treated for 3 h in a flow of hydrogen at a rate of 50 ml/min. Then the temperature is elevated to 400° C. and 10 ml/min hydrogen sulfide are admixed; this initiates the sulfidation of Ru into black ruthenium sulfide ($RuS_2$) which is continued for a further 4 h [A. Ishiguro, T. Nakajima, T. Iwata, M. Fujita, T. Minato, F. Kiyotaki, Y. Izumi, K.-i. Aika, M. Uchida, K. Kimoto, Y. Matsui, Y. Wakatsuki, Chem. Eur. J. 2002, 8 (14), 3260-3268./K. Hara, K. Sayama, H. Arakawa, Appl. Catal. A.: Gen. 1999, 189 (1), 127-137]. This results in a gray powder which is then admixed in a quantity of 50 mg with 1 ml water and sufficiently suspended in the ultrasonic bath to give a light gray suspension of $RuS_2$ (2% by weight) on $TiO_2$.

B. Applying the Above Oxidation-Promoting First Photoactive Material to an ITO Substrate Commercially available glass slides coated on one side with indium tin oxide (ITO) (available from PGO Präzisions Glas & Optik GmbH, Im Langen Busch 14, D-58640 Iserlohn, Germany) are thinly coated on the ITO side with an aqueous 10% $TiO_2$ suspension (from Aldrich, particle size <40 nm) and sintered for 60 min at 450° C., after which the aqueous 5% suspension of $TiO_2/2\%$ by weight $RuS_2$ as prepared above is coated and the slides resintered for 60 min at 450° C. under an inert gas atmosphere.

The resulting slide is designated Ox-I.

Example 2

A. Preparation of Photoactive $WO_3$ Nanoparticles and their Platinized Form as Oxidation-Promoting First Photoactive Materials The preparation of photoactive $WO_3$ nanoparticles was performed according to literature procedures (J. Polleux, M. Antonietti, M. Niederberger, J. Mater. Chem. 2006, 16 (40), 3969-3975./M. Niederberger M. H. Bartl, G. D. Stucky, J. Am. Chem. Soc. 2002, 124 (46), 13642-13643./J. Polleux, N. Pinna, M. Antonietti, M. Niederberger, J. Am. Chem. Soc. 2005, 127 (44), 15595-15601.)

In a typical experiment tungsten hexachloride ($WCl_6$, 430 mg) was dissolved in 20 ml of anhydrous benzyl alcohol (or a mixture thereof with 4-tert.-butyl-benzylalcohol). The closed reaction vessel was heated at 100° C. with stirring for 48 hr. The product was collected by alternating sedimentation and decantation and washed three times with 15 ml EtOH. The material obtained was dried in air at 60 C for several hours to yield a yellow powder of $WO_3$.

For an optional platinization, 50 mg of powder was suspended in a mixture of ethanol (50%) and water (50%). Pt cocatalyst (2% weight per $WO_3$) was deposited from a neutralized aqueous solution of $H_2PtCl_6.6H_2O$ by a photodeposition method (K. Yamaguti, S. Sato, J. Chem. Soc. Faraday Trans 1 1985, 81 (5), 1237-1246./T. Sakata, T. Kawai, K. Hashimoto, Chem. Phys. Lett. 1982, 88 (1), 50-54.)

B. Applying the Above Oxidation-Promoting First Photoactive Materials to an ITO Substrate Quantities of 20 mg dry powder of platinized (grey) or non-platinized (yellow) catalyst were resuspended by ultrasonication in a mixture of 0.4 ml abs. isopropanol and 0.2 ml water (Suprapur). Small aliquots of each suspension were deposited on appropriate ITO-coated glass slides, respectively. The catalyst coated slides were air dried for 15 min and subsequently sintered at 450 h for 2 hr.

The resulting slide coated with plain WO$_3$ is designated Ox-IIa.

The resulting slide coated with platinized WO$_3$ is designated Ox-IIb.

Example 3

A. Preparation of the Mn$_4$O$_4$ Oxo-Cubane Complex Mn$_4$O$_4$(Phenyl$_2$PO$_2$) as a Oxidation-Promoting First Photoactive Material

[On the basis of literature procedures: R. Brimblecombe, G. F. Swiegers, G. C. Dismukes, L. Spiccia, *Angew. Chem. Int. Ed.* 2008, 47 (38), 7335-7338./T. G. Carrell, S. Cohen, G. C. Dismukes, *J. Mol. Cat. A* 2002, 187 (1), 3-15.]

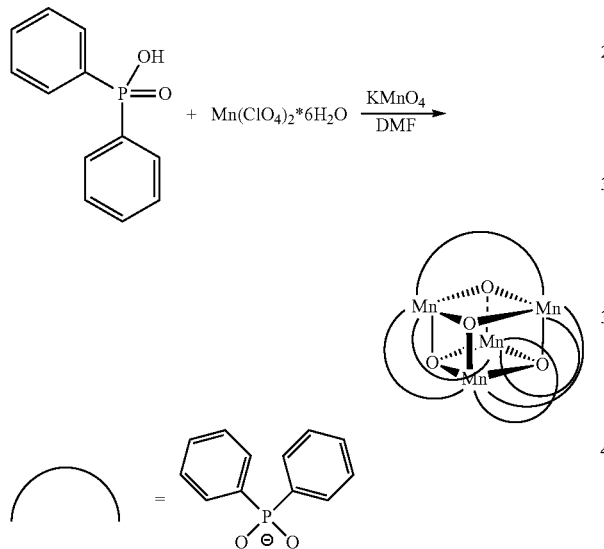

A solution of 60 mg NaOH (1.5 mmol) in 20 ml DMF is provided under inert gas atmosphere (N$_2$). 330 mg diphenyl phosphinic acid (1.5 mmol) and 255 mg manganese(II) perchlorate (0.7 mmol) dissolved in 8 ml DMF are added to the solution with vigorous stirring. After a reaction period of 15 min 50 mg KMnO$_4$ (0.3 mmol) dissolved in 18 ml DMF are slowly added dropwise through an addition funnel. A brownish red suspension is formed, which is stirred for 16 hr at RT. Die suspension is filtert, the residue washed with each of 40 ml of methanol and ether and dried. The title complex is obtained in the form of a brownish red powder.

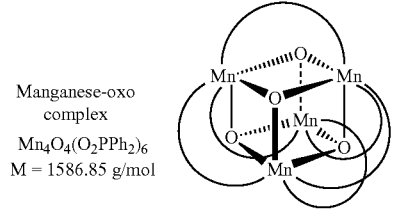

Manganese-oxo complex
Mn$_4$O$_4$(O$_2$PPh$_2$)$_6$
M = 1586.85 g/mol

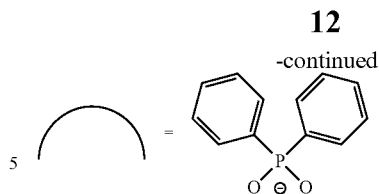

UV/Vis (CH$_2$Cl$_2$): $\lambda_{max}$ (lg $\epsilon$)=229.0 (0.80), 263.0 (0.36), 257.0 (0.36), 269.5 (0.34).

Figure 5:
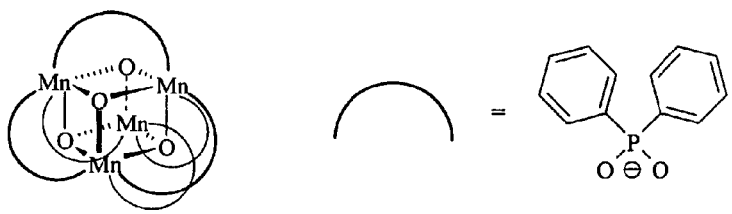
FIG. 5 depicts the UV/Vis spectrum of $Mn_4O_4$ $(phenyl_2PO_2)$
Figure 5:
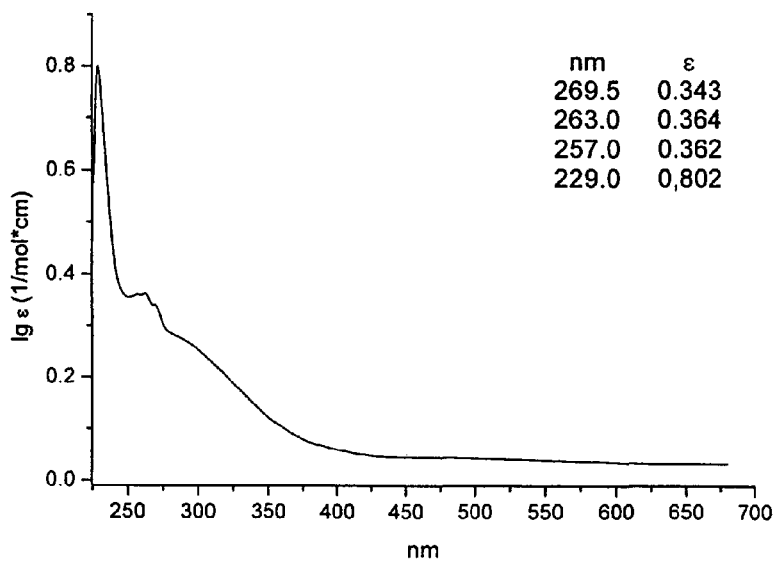

UV/Vis spektrum: see FIG. 5

B. Applying the Above Oxidation-Promoting First Photoactive Material to an ITO Substrate in a Nafion® Matrix The application of the above Mn$_4$O$_4$(phenyl$_2$PO$_2$) complex to an ITO-coated glass slide was effected on the basis of the following literature procedures: M. Yagi, K. Nagai, A. Kira, M. Kaneko, *J. Electroanal. Chem.* 1995, 394 (1-2), 169-175.

Commercially available glass slides coated on one side with indium tin oxide (ITO) (available from PGO Präzisions Glas & Optik GmbH, Im Langen Busch 14, D-58640 Iserlohn, Germany) are thinly coated on the ITO side with a 1 mM solution of the Mn$_4$O$_4$(phenyl$_2$PO$_2$) complex which was dissolved in a 1:1 mixture of Nafion® 117 solution and abs. Ethanol and dried for 12 hr in air.

The resulting slide is designated Ox-III.

Example 4

A. Tris[4-(11-mercaptoundecyl)-4'-methyl-2,2'-bipyridine]ruthenium(II)-bis-(hexafluorophosphate), a reduction-promoting second photoactive material A.1 Preparation of the protected bipyridine ligand 4-(4'-methyl-2,2'-bipyridine)-undecylthio-S-acetate (B)

[Analogous to D. K. Ellison, R. T. Iwamato, *Tet. Lett.* 1983, 24 (1), 31-32./P. K. Gosh, T. G. Spiro, *J. Am. Chem. Soc.* 1980, 102 (17), 5543-5549.]

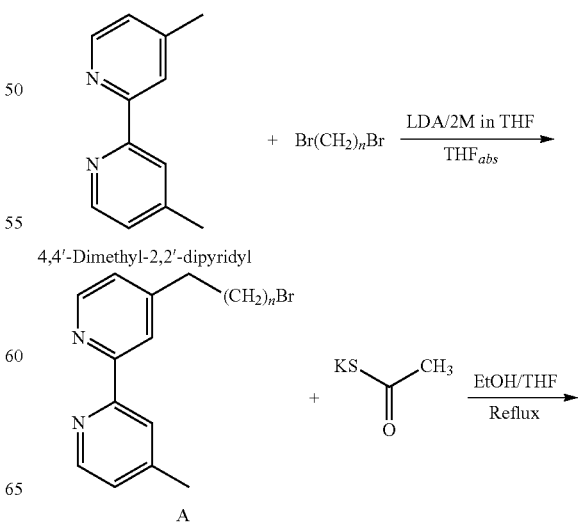

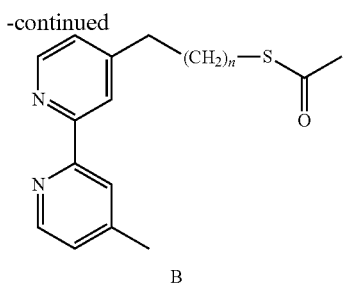

n = 10 a) 4-(11-bromoundecyl)-4'-methyl-2,2'-bipyridine (A)

100 ml abs. tetrahydrofurane (THF) are cooled to 0° C. in an inert gas atmosphere (N$_2$) and mixed with 2.00 g (10.9 mmol) of 4,4'-dimethyl-2,2'-bipyridine. After stirring for 15 min at 0° C. 5.45 ml (10.9 mmol) of a 2 M solution of lithium diisopropylamide (LDA) are added to the THF which is then reacted for 2 hr with cooling. The reaction solution is added dropwise over a period of 30 min to a solution of 3.30 g (11.0 mmol) of 1.10 dibromodecane in 30 ml abs. THF at 0° C. The brownish clear solution is stirred for a further 2 hr at 0° C. and for 16 hr at RT before being quenched with 10 ml H$_2$O. The suspension is then concentrated under a reduced pressure almost until dry. The aqueous residue is taken up in 25 ml of water, and 25 ml brine is added and the mixture extracted three times with 75 ml CHCl$_3$ each. The organic phases are dried over Na$_2$SO$_4$, filtered and concentrated until dry under a reduced pressure. Purifying of the product mixture is achieved on silica gel with ethyl acetate (EtOAc). The product A is obtained in the form of a beige crystalline powder.

b) 4-(4'-Methyl-2,2'-bipyridine)-undecylthio-S-acetate (B)

[Analogous to H. Imahori, A. Fujimoto, S. Kang, H. Hotta, K. Yoshida, T. Umeyama, Y. Matano, S. Isoda, *Tetrahedron* 2006, 62 (9), 1955-1966.]

Under an inert gas atmosphere (N$_2$) a solution of 1.20 g of A (2.97 mmol) in abs. ethanol (EtOH) and abs. THF (50 ml, 1/1, V/V) is combined with 2.04 g thioacetate (6 equ., 17.9 mmol) and refluxed for 2 hr. After completion of the reaction the reddish-brown clear solution is concentrated at a reduced pressure. The residue is then taken up in 50 ml of chloroform, washed twice with 40 ml of water each and once with 40 ml brine, dried over Na$_2$SO$_4$, filtered and the solvent removed at a reduced pressure. The residue is purified on silica gel with EtOAc/n-hexane (1:1). Product B is obtained as a yellow solid.

4-(4'-Methyl-2,2'-bipyridine)-undecylthio-S-acetate (B)

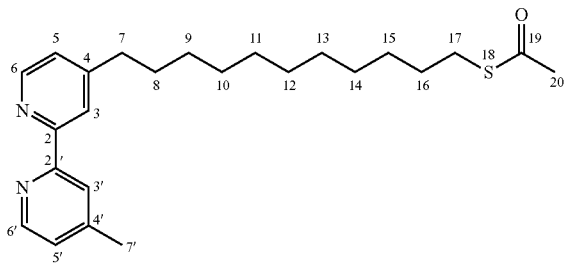

M = 398.62 g/mol
C$_{24}$H$_{34}$N$_2$OS $^1$H-NMR (300 MHz, CDCl$_3$): δ=8.53 (dd, 2H, J$_{5/6}$=J$_{5'/6'}$=4.2 Hz, J$_{3/6}$=J$_{3'/6'}$=0.6 Hz, 6-H, 6'-H), 8.21 (br s, 2H, 3-H, 3'-H), 7.14 (dd, 2H, J$_{5/6}$=J$_{5'/6'}$=4.8 Hz, J$_{3/5}$=J$_{3'/5'}$=1.5 Hz, 5-H, 5'-H), 2.84 (t, J=7.5 Hz, 2H, 17-CH$_2$, S—CH$_2$), 2.67 (t, J=7.8 Hz, 2H, 7-CH$_2$, Aryl-CH$_2$), 2.42 (s, 3H, 7'-CH$_3$, Aryl-CH$_3$), 2.30 (s, 3H, 20-CH$_3$, CO—CH$_3$), 1.72-1.62 (m, 2H, 8-CH$_2$), 1.59-1.49 (m, 2H, 16-CH$_2$), 1.38-1.24 (m, 14H, 9/10/11/12/13/14/15-CH$_2$).

$^{13}$C-NMR (75.5 MHz, CDCl$_3$): δ=196.0 (C-19), 156.1 (C-2), 156.0 (C-2'), 152.9 (C-4), 148.9 (C-6), 148.9 (C-6'), 148.1 (C-4'), 124.6 (C-3'), 123.9 (C-3), 122.0 (C-5'), 121.2 (C-5), 35.5 (C-7), 30.6 (C-17), 30.4 (C-8), 29.4 (C-11/12), 29.4 (C-10), 29.4 (C-13), 29.3 (C-15), 29.3 (C-9), 29.1 (C-16), 29.0 (C-20), 28.8 (C-14), 21.2 (C-7').

EI-MS (70 eV): m/z (%)=398 (4) [M$^+$], 357 (18), 356 (68), 355 (90) [M$^+$-Me, —CO], 324 (9), 323 (39), 309 (18), 295 (12), 281 (10), 267 (6), 253 (6), 239 (6), 211 (13), 209 (5), 198 (21), 197 (100), 185 (12), 184 (95), 183 (10), 170 (5), 43 (30), 41 (5).

UV/Vis (MeOH): λ$_{max}$ (lg ε)=236.5 (0.74), 280 (0.71).

A.2 Preparation of Tris[4-(11-mercaptoundecyl)-4'-methyl-2,2'-bipyridine]-ruthenium(II)-bis(hexafluorophosphate) (C)

a) Tris[4-(4'-methyl-2,2'-bipyridine)-undecylthio-S-acetate]-ruthenium(II)-bis(hexafluorophosphate) (protected C)

[Analogous to R. A. Palmer, T. S. Piper, *Inorg. Chem.* 1966, 5 (5), 864-878. und Y-R. Hong, C. B. Gorman, *J. Org. Chem.* 2003, 68 (23), 9019-9025.]

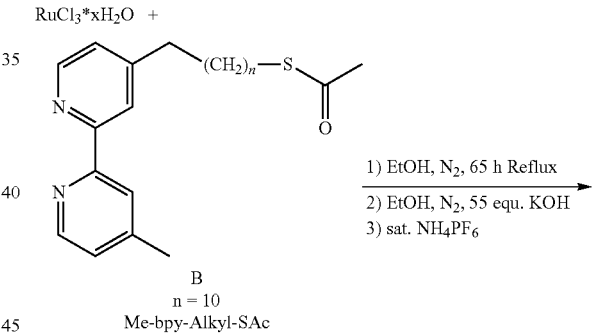

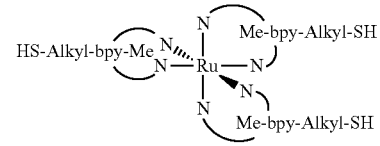

Alkyl = (CH$_2$)$_{11}$

Under an inert gas atmosphere (N$_2$) 30 ml of abs. ethanol flushed with N$_2$ are combined with 180 mg (452 μmol/25% excess relative to RuCl$_3$) of B as prepared in Example 4.A.b. To reaction solution 25 mg of RuCl$_3$·H$_2$O (120.5 μmol) in 5 ml abs. ethanol are added and refluxed for 65 hr in the dark. After completion of the reaction the reddish-brown suspension is filtered and the clear reddish-orange filtrate is concentrated on a rotational evaporator at a reduced pressure. The red residue taken up in 20 ml of CH$_2$Cl$_2$ and washed twice with 20 ml of water each. The organic phase is dried over Na$_2$SO$_4$, filtered and concentrated on a rotational evaporator at a reduced pressure. The resulting reddish-brown product mixture is purified on silica gel with CHCl$_3$/methanol (15/1) to obtain the title compound.

b) Tris[4-(11-mercaptoundecyl)-4'-methyl-2,2'-bipyridine]-ruthenium(II)-bis-(hexafluorophosphate) (C)

[Analogous to H. Imahori, A. Fujimoto, S. Kang, H. Hotta, K. Yoshida, T. Umeyama, Y. Matano, S. (soda, *Tetrahedron* 2006, 62 (9), 1955-1966./F. Ono, S. Kanemasa, J. Tanaka, *Tetrahedron Lett.* 2005, 46 (44), 7623-7626./T. Suzuki, A. Matsuura, A. Kouketsu, S. Hisakawa, H. Nakagawa, N. Miyata, *Bioorg. Med. Chem.* 2005, 13 (13), 4332-4342.]

In a 100 ml three-neck round bottom flask 10 ml abs. ethanol are flushed for 30 min with $N_2$. Together with a further 10 ml of abs THF 44 mg (32.2 μmol) of the protected Ru complex as prepared above in section A.2.a at RT are transferred into the flask and combined with 100 mg KOH (55 eq.). The reaction solution is stirred for 60 min at RT, then poured onto 15 ml of brine and extracted with 25 ml of $CH_2Cl_2$. The organic phase is briefly dried over $Na_2SO_4$, filtered and concentrated at a reduced pressure. The red complex is combined with a solution of 105 mg $NH_4 PF_6$ (0.6 mmol, ~20 eq.) in 5 ml methanol and stirred for 120 min at RT in the dark. The red solution is washed twice with water, dried over a little $Na_2SO_4$, filtered and stripped in a rotational evaporator at a reduced pressure. The residue is dissolved in a little $CH_2Cl_2$ and triturated with petrol ether. The title Ru complex C precipitates as an orange-red powder.

Tris[4-(11-mercaptoundecyl)-4'-methyl-2,2'-bipyridine]-ruthenium(II)-bis(hexafluorophosphate) (C)

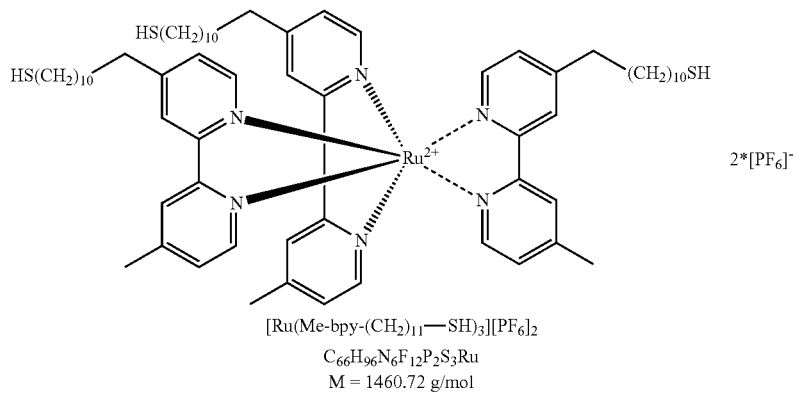

[Ru(Me-bpy-(CH$_2$)$_{11}$—SH)$_3$][PF$_6$]$_2$
C$_{66}$H$_{96}$N$_6$F$_{12}$P$_2$S$_3$Ru
M = 1460.72 g/mol $^1$H-NMR (300 MHz, CDCl$_3$): δ=8.17 (d, 2H*3, J=7.8 Hz, 6-H*3, 6'-H*3), 7.58-7.45 (m, 2H*3, 3-H*3, 3'-H*3), 7.23 (dd, 2H*3 J=5 Hz, J=2 Hz, 5-H*3, 5'-H*3), 2.79 (t, 2H*3, J=8 Hz, 7-CH$_2$, Aryl-CH$_2$), 2.53 (s, 3H*3, 7'-CH$_3$, Aryl-Me), 2.50 (t, 2H*3, J=7.2 Hz, 17-CH$_2$, S—CH$_2$), 1.72-1.62 (m, 2H*3, 8-CH$_2$), 1.61-1.54 (m, 2H*3, 16-CH$_2$), 1.32 (t, 3*1H, J=7.5 Hz, —SH) 1.38-1.23 (m, 14H*3, 9/10/11/12/13/14/15-CH$_2$).

$^{13}$C-NMR (75.5 MHz, CDCl$_3$): δ=156.4 (C-2), 156.3 (C-2'), 154.5 (C-4), 150.8 (C-6), 150.6 (C-6'), 150.0 (C-4'), 129.0 (C-3'), 128.0 (C-3), 124.6 (C-5'), 123.8 (C-5), 35.4 (C-7), 34.0 (C-16), 30.0 (C-8), 29.5 (C-10), 29.4 (C-11/12), 29.4 (C-13), 29.3 (C-15), 29.0 (C-9), 28.3 (C-14), 24.6 (C-17), 21.3 (C-7').

ESI-MS: m/z=1315.6 ([M-(PF$_6$)]$^+$), 585.3 ([M-(2*PF$_6$)]$^{2+}$).

Figure 3:
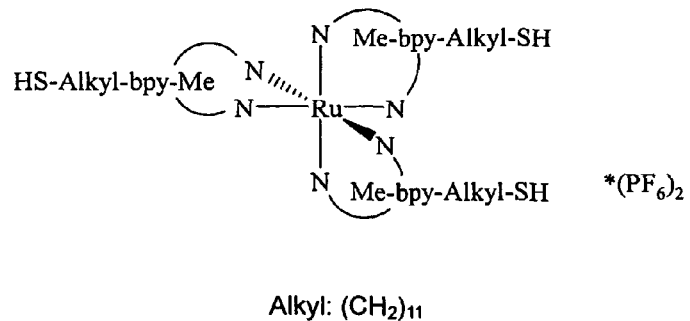
FIG. 3 depicts the UV/Vis spectrum of tris[4-(11-mercaptoundecyl)-4'-methyl-2,2'-bipyridin]ruthenium(II)-bis(hexafluorophosphate).
Figure 3:
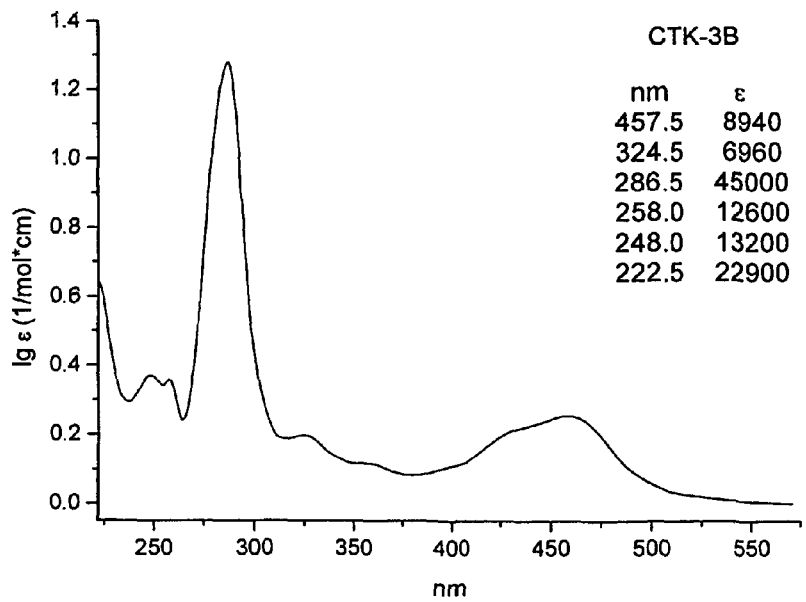

UV/Vis (MeOH): $\lambda_{max}$(lg ε)=286.5 (1.27), 248.0 (0.36), 258.0 (0.35), 457.5 (0.26), 436 (sh, 0.22), 324.5 (0.20).
UV/Vis spectrum: see FIG. 3

B. Applying the Reduction-Promoting Second Photoactive Material C to an Inert Substrate Glass slides of the same size as used for applying the first photoactive material to glass slides and having a 50 nm gold coating on one of the sides precoated with 5-10 nm chromium are treated with a solution of tris[4-(11-mercaptoundecyl)-4'-methyl-2,2'-bipyridine]-ruthenium(II)-bis(hexafluorophosphate) (C) in ethanol. In one embodiment the coating the complex in solution is performed in the presence of an alkylthiol having a chain length C8, C10, C12, C14, C16 or C18 as a coadsorbate analogous to S. J. Summer, S. E. Creager, *J. Am. Chem. Soc.* 2000, 122 (48), 11914-11920. To increase the solubility of the complex the solution where necessary is combined with a little dichloromethane. In another embodiment, the coating is performed without coadsorbate analogous to Y. S. Obeng, A. J. Bard, *Langmuir* 1991, 7 (1), 195-201. After coating, the slides are dried.

The resulting slide is designated Red-I.

Example 5

A. Preparation of [(2,2'-bipyridine)[4-(11-acetylsulfanylundecyl)-4'-methyl-2,2'-bipyridine]-ruthenium (II)-[(tetrapyridophenazine)-palladium(II)-dichloro] bis-(hexafluorophosphate) (H) as a reduction-promoting second photoactive material (Abbreviations used for the ligands: bpy=2,2'-bipyridine, Me-bpy=4'-methyl-2,2'-bipyridine, tppz=tetrapyridophenazine)

The following preparations are performed in analogy to P. A. Anderson, G. B. Deacon, K. H. Haarmann, F. R. Keene, T. J. Meyer, D. A. Reitsma, B. W. Skelton, G. F. Strouse, N. C. Thomas, J. A. Treadway, A. H. White, *Inorg. Chem.* 1995, 34 (24), 6145-6157.

A.1 Preparation of cis-dicarbonyl (2,2'-bipyridine)[4-(11-acetylsulfanyl-undecyl)-4'-methyl-2,2'-bipyridine]-ruthenium(II)-bis(hexafluorophosphate) (E)

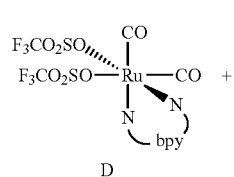

D

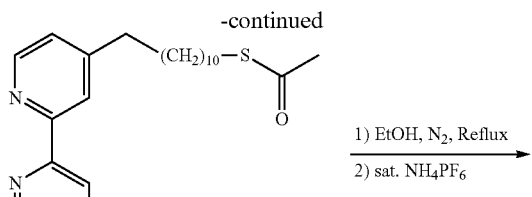

195 mg 4-(4'-Methyl-2,2'-bipyridine)-undecylthio-5-acetate (B) (0.49 mmol; prepared in Example 4, section 4.1.b) are dissolved in 30 ml abs. ethanol under an inert atmosphere ($N_2$). 150 mg cis,cis-[Ru(bpy)(CO)$_2$(CF$_3$SO$_3$)$_2$] (D) (0.25 mmol; prepared according to P. A. Anderson, G. B. Deacon, K. H. Haarmann, F. R. Keene, T. J. Meyer, D. A. Reitsma, B. W. Skelton, G. F. Strouse, N. C. Thomas, J. A. Treadway, A. H. White, *Inorg. Chem.* 1995, 34 (24), 6145-6157) are added to the solution and heated for 2 hr at reflux. The clear reddish solution is concentrated under a reduced pressure until dry. The residue is dissolved in 25 ml of water and filtered. After cooling to RT 5 ml of an aqueous solution of NH$_4$PF$_6$ saturated when cold is added to the filtrate immediately yielding a colorless precipitate. The precipitate is filtered off and washed with 30 ml of cold water. The title product (E) is obtained as a pink solid which is recrystallized in little ethanol/acetone.

cis-Dicarbonyl(2,2'-bipyridine)[4-(11-acetylsulfanylundecyl)-4'-methyl-2,2'-bipyridine]-ruthenium(II)-bis(hexafluorophosphate) (E)

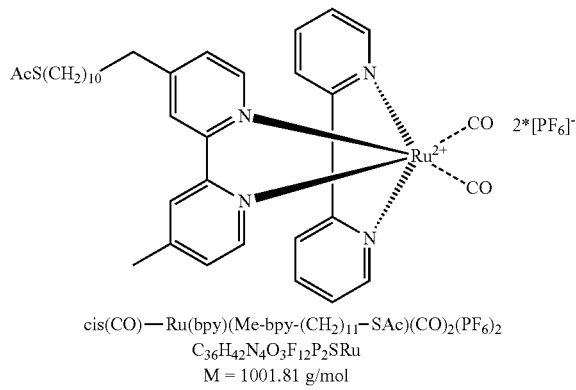

Compound E exists in two geometric isomers A/B [T. J. Rutherford, F. R. Keene, *Inorg. Chem.* 1997, 36 (13), 2872-2878.]

$^1$H-NMR (300 MHz, (CD$_3$)$_2$CO): δ=9.50 (m, H, Aryl-H), 9.31 (dd, H, J=6.0 Hz, J=8.0 Hz, Aryl-H), 8.94 (d, H, J=8.4 Hz, Aryl-H), 8.85 (m, H, Aryl-H), 8.82 (d, H, J=8.4 Hz, Aryl-H), 8.73 (m, H, Aryl-H), 8.63 (m, H, Aryl-H), 8.39 (m, H, Aryl-H), 8.11 (m, H, Aryl-H), 7.96 (m, H, Aryl-H), 7.82 (m, H, Aryl-H), 7.69 (m, H, Aryl-H), 7.65 (t, H, J=6.0 Hz, Aryl-H), 7.52 (m, H, Aryl-H), 3.04/2.82 (t, 2H, J=8 Hz, 7-CH$_2$ A/B), 2.85/2.83 (t, 2H, J=7.2 Hz, 17-CH$_2$ A/B), 2.75/2.53 (s, 3H, Aryl-CH$_3$ A/B), 2.29/2.28 (s, 3H, CO—CH$_3$ A/B), 1.86/1.65 (m, 2H, 8-CH$_2$ A/B), 1.57-1.45 (m, (m, 2H, 16-CH$_2$ A/B), 1.31-1.25 (m, 14H, 9/10/11/12/13/14/15-CH$_2$ A/B).

EI-MS (70 eV): m/z (%)=713 (8) [M-H$^+$-2*PF$_6$], 616 (12), 506 (9), 449 (14), 353 (22), 322 (35), 197 (100), 184 (88), 156 (28), 65 (17).

A.2 Preparation of (2,2'-bipyridine)[4-(11-acetylsulfanylundecyl)-4'-methyl-2,2'-bipyridine]-ruthenium(II)-(tetrapyridophenazine)-bis(hexafluorophosphate) (G)

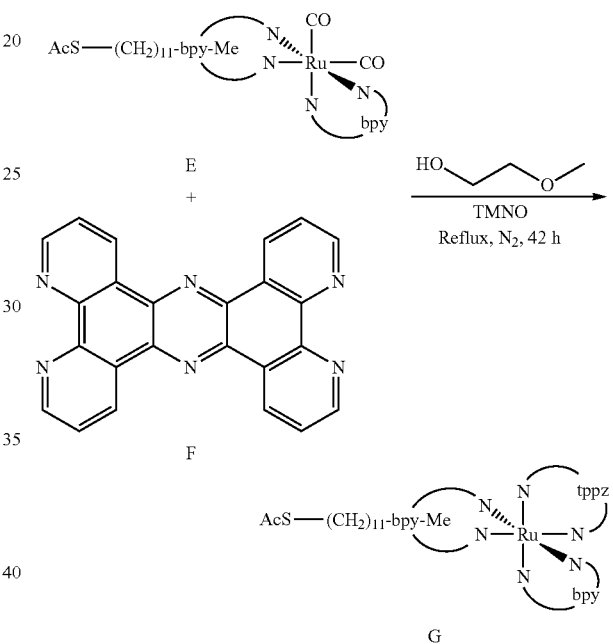

145 mg cis-dicarbonyl (2,2'-bipyridine)[4-(11-acetylsulfanylundecyl)-4'-methyl-2,2'-bipyridine]-ruthenium(II)-bis(hexafluorophosphate) (E) (145 µmol; prepared above in section A.1) are dissolved in 40 ml of abs. 2-methoxyethanol. 165 mg tetrapyridophenazine (F) (tppz; 0.43 mmol, 3 eq.; prepared according to W. Paw, R. Eisenberg, *Inorg. Chem.* 1997, 36 (11), 2287-2293./J. Bolger, A. Gourdon, E. Ishow, J.-P. Launay, *J. Chem. Soc., Chem. Commun.* 1995, 1799-1800). in a further 10 ml of abs. 2-methoxyethanol are added thereto. The yellow suspension is continuously gently flushed with N$_2$. After heating to 100° C. and purging with N$_2$ for about 10 min 56 mg trimethylamine-N-oxide (ZMNO, 0.5 mmol, ~3.5 eq.) dissolved in 5 ml of abs. 2-methoxyethanol are added. While purging continuously with N$_2$ the suspension is refluxed for 24 hr in the dark. After completion of the reaction the reddish brown-suspension is concentrated to half of its volume and left for 30 min in the dark. The settled non-reacted tppz is filter off. The residue in the filter is washed with 15 ml of ethanol and the deep red filtrate is concentrated under a reduced pressure. A deep red, almost black oil is obtained. After chromatographic separation and purification on silica gel with CHCl$_3$/methanol (5:1) the title product (G) is isolated as a orange-red enamel-like solid.

(2,2'-Bipyridine)[4-(11-acetylsulfanylundecyl)-4'-methyl-2,2'-bipyridine]-ruthenium(II)-(tetrapyridophenazine)-bis(hexafluorophosphate) (G)

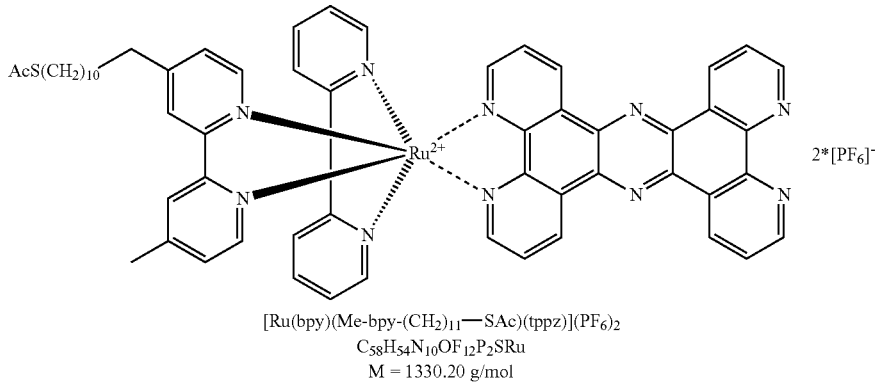

[Ru(bpy)(Me-bpy-(CH$_2$)$_{11}$—SAc)(tppz)](PF$_6$)$_2$
C$_{58}$H$_{54}$N$_{10}$OF$_{12}$P$_2$SRu
M = 1330.20 g/mol ESI-MS (CH$_3$CN): m/z=566.2 ([M-(2*PF$_6$)+HCOOH]$^{2+}$).
UV/Vis (CH$_3$CN): $\lambda_{max}$ (lg $\epsilon$)=282.0 (1.02), 244.0 (0.60), 379.5 (0.19), 359.0 (0.16), 453.5 (0.16), 434.0 (sh, 0.15).

A.3 Preparation of [(2,2'-bipyridine)[4-(11-acetylsulfanylundecyl)-4'-methyl-2,2'-bipyridine]-ruthenium(II)-[(tetrapyridophenazine)-palladium(II)-dichloro]bis(hexafluorophosphate) (H)

The reaction is performed in analogy to the procedure of S. Rau, B. Schäfer, D. Gleich, E. Anders, M. Rudolph, M. Friedrich, H. Görls, W. Henry, J. G. Vos, *Angew. Chem. Int. Ed.* 2006, 45, 6215-6218.

6 mg of bis(acetonitrile)-palladium(II)-dichloride (23 µmol, 15% excess; Aldrich) is combined with 20 ml of abs. dichloromethane (DCM) in an inert gas atmosphere (N$_2$) and 26 mg of (2,2'-bipyridine)[4-(11-acetylsulfanylundecyl)-4'-methyl-2,2'-bipyridine]-ruthenium(II)-(tetrapyridophenazine)-bis(hexafluorophosphate) suspended in 2 ml of abs. DCM is added. The reaction mixture is heated to reflux for 6 hr under N$_2$. After completion of the reaction the suspension is cooled to RT, filtered, and the reddish-brown residue is washed with little DCM. After drying the title product is obtained as reddish-brown solid.

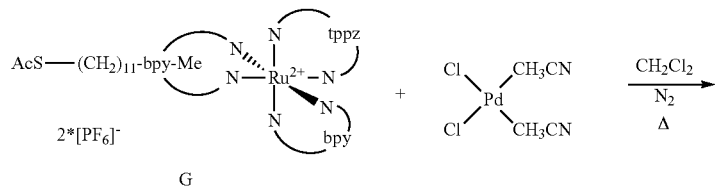

G

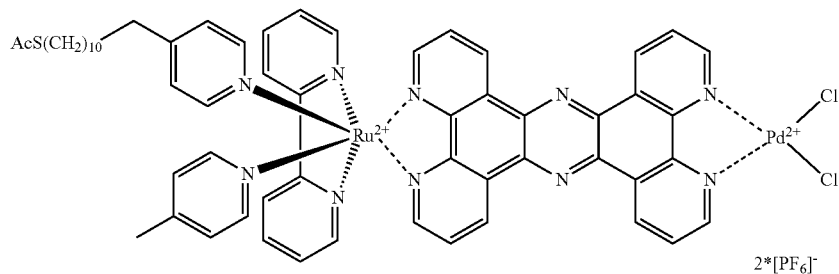

H

[(2,2'-Bipyridine)[4-(11-acetylsulfanylundecyl)-4'-methyl-2,2'-bipyridine]-ruthenium(II)-[(tetrapyridophenazine)-palladium(II)-dichloro]-bis (hexafluorophosphate) (H)

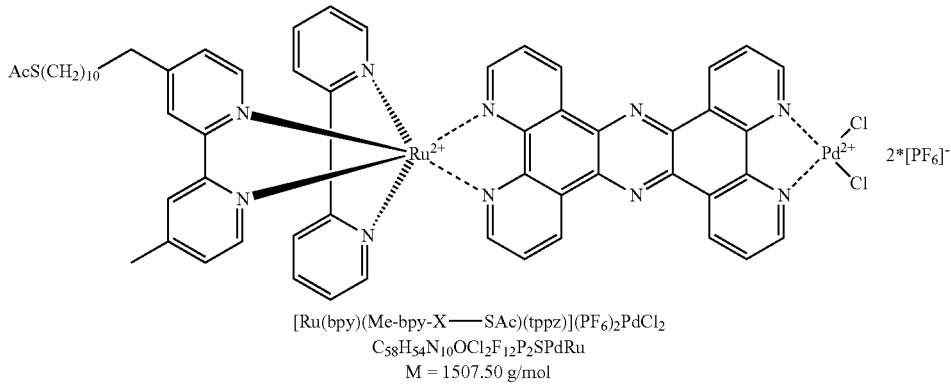

Figure 4:
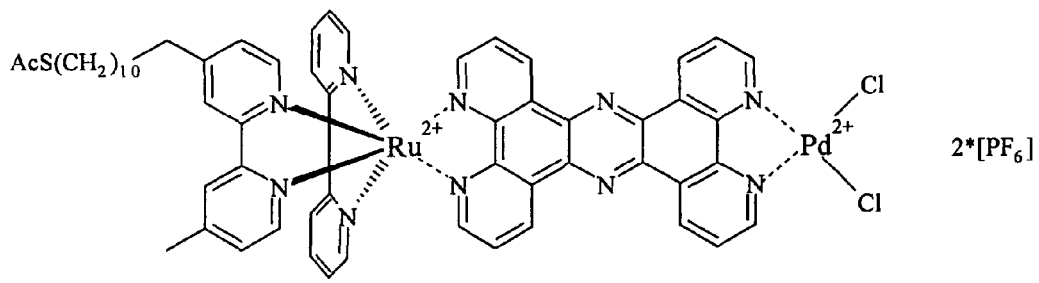
FIG. 4 depicts the UV/Vis spectrum of [(2,2'-bipyridine)[4-(11-acetylsulfanylundecyl)-4'-methyl-2,2'-bipyridine]-ruthenium(II)-[(tetrapyridophenazine)-palladium(II)-dichloro]-bis(hexafluorophosphate)
Figure 4:
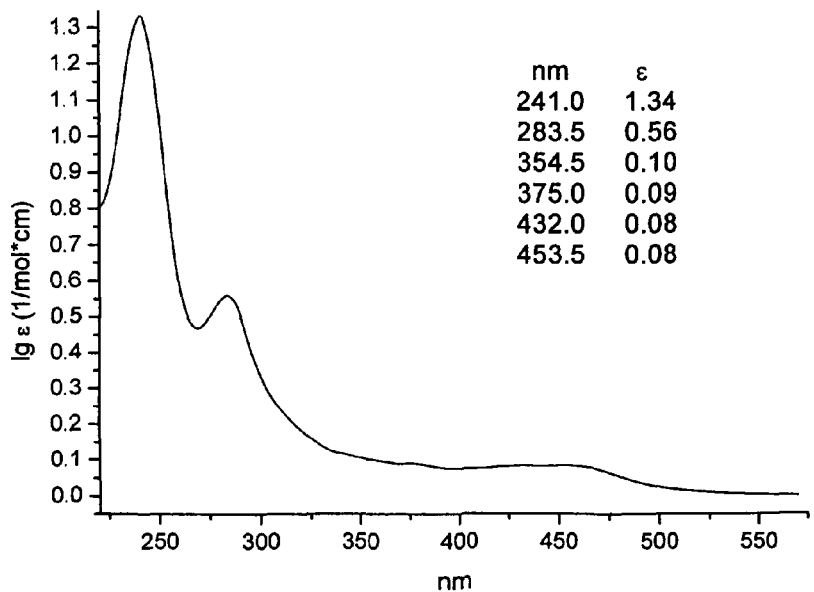

[Ru(bpy)(Me-bpy-X——SAc)(tppz)](PF$_6$)$_2$PdCl$_2$
C$_{58}$H$_{54}$N$_{10}$OCl$_2$F$_{12}$P$_2$SPdRu
M = 1507.50 g/mol ESI-MS (CH$_3$CN): m/z=673.2 ([M-(2*PF$_6$)]$^{2+}$+HCOOH+H$_2$O]).
FAB-MS (−): m/z=1526.2 (MH$^−$+H$_2$O).
UV/Vis (CH$_3$CN): $\lambda_{max}$ (lg $\epsilon$)=241.0 (1.34), 283.5 (0.56), 354.5 (sh, 0.10), 432.0 (0.08), 453.5 (0.08).
UV/Vis spectrum: see FIG. 4

B. Applying the Reduction-Promoting Second Photoactive Material H to an Inert Substrate The coating of the complex H is performed in analogy to S. J. Summer, S. E. Creager, *J. Am. Chem. Soc.* 2000, 122 (48), 11914-11920/S. E. Craeger, G. K. Rowe, *J. Electroanal. Chem.* 1994, 370 (1-2), 203-211 (coating in CH$_3$CN)/J. M. Tour, L. Jones II, D. L. Pearson, J. J. S. Lamba, T. P. Burgin, G. M. Whitesides, D. L. Allara, A. N. Parikh, S. V. Atre, *J. Am. Chem. Soc.* 1995, 117 (37), 9529-9534./L. Cai, Y. Yao, J. Yang, D. W. Price jr., J. M. Tour, *Chem. Mater.* 2002, 14 (7), 2905-2909 (coating with acetylsulfanyl group).

Glass slides of the same size as used for applying the first photoactive material to glass slides and having a 50 nm gold coating on one of the sides precoated with 5-10 nm chromium are treated with a solution of the complex H in CH$_3$CN. The coating is performed in the presence of a coadsorbate (a C12 or C16 alkylthiol) as well as without coadsorbate. After coating the slides are washed and dried.

The resulting slide is designated Red-II.

Example 6

A. Preparation of Platinized SrTiO$_3$ Codoped with 2.5% Antimony and 2.0% Chromium as a Reduction-Promoting Second Photoactive Material The preparation of the photoactive codoped SrTiO$_3$ was performed according to literature procedures (H. Kato, A. Kudo, *J. Phys. Chem. B* 2002, 106 (19), 5029-5034.)

Appropriate quantities of the starting materials SrCO$_3$, TiO$_2$, Sb$_2$O$_3$ and Cr$_2$O$_3$ according to the formula SrTi$_{1-X-Y}$Sb$_X$Cr$_Y$O$_3$ were extensively mixed in a mortar. The mixture was transferred in an alumina crucible and calcined at 1050° C. for at least 30 h in air. The material obtained was ball milled (GERMATECH GmbH, Osterfeldstr. 3, D-56235 Ransbach-Baumbach, Germany) until a finely ground powder was obtained.

For platinization the powder was suspended in a mixture of ethanol (20%), water (80%). Pt cocatalyst (2% weight per WO$_3$) was deposited from a neutralized aqueous solution of H$_2$PtCl$_6$.6H$_2$O by a photodeposition method (K. Yamaguti, S. Sato, *J. Chem. Soc. Faraday Trans* 1 1985, 81 (5), 1237-1246./T. Sakata, T. Kawai, K. Hashimoto, *Chem. Phys. Lett.* 1982, 88 (1), 50-54.)

B. Applying the Above Reduction-Promoting Second Photoactive Material to an ITO Substrate 100 mg of dry powder of the platinized SrTiO$_3$ codoped with 2.5% antimony and 2.0% chromium were resuspended by ultrasonication in a mixture of 2 ml abs. ispropanol and 1 ml water (Suprapur). Small aliquots of the suspension were deposited on commercially available glass slides coated on one side with indium tin oxide (ITO) (available from PGO Präzisions Glas & Optik GmbH, Im Langen Busch 14, D-58640 Iserlohn, Germany). The catalyst-coated plates were air dried for 15 min and subsequently sintered for 2 hr at 450 h.

The resulting slide is designated Red-III.

Example 7

Combination of the Catalyst Units Comprising the First and Second Photoactive Materials into a Catalyst System and Irradiation

7.1.a Combining Ox-I and Red-I

Both of the catalyst units (slide Ox-I and slide Red-I) produced in Example 1 and Example 4, respectively, comprising the oxidation-promoting first photoactive material RuS$_4$ and the reduction-promoting second photoactive material tris[4-(11-mercaptoundecyl)-4'-methyl-2,2'-bipyridine] ruthenium(II)-bis-(hexafluorophosphate), respectively, are bonded together by their non-coated faces and the coated surfaces of the two units are conductively interconnected by a copper conductive adhesive tape (made by PGO Präzisions Glas & Optik GmbH, Im Langen Busch 14, D-58640 Iserlohn, Germany). The gold side of Red-I is then coated with a resist so that the Cu bands and edges of the gold layer and a small band along the edges of the slide containing the complex on the gold layer are covered. After having dried the assembled and conductively connected catalyst units the gold side coated with the complex is again vapor deposited with a very thin gold layer (5 nm) so that also the adjoining resist layer is covered finally, the catalyst system is completed by coating this gold layer with 0.5-0.7 monolayers (ML) of platinum.

7.1.b Irradiating the catalyst system (Ox-I)-(Red-I)

A catalyst system as made in Section 7.1.a was adhered to a Nafion® membrane and a window was cut into the membrane so that both sides of the system were exposed. The membrane comprising the catalyst system was inserted into a photoreactor so that two compartments were formed. Both compartments were filled in deoxygenized water saturated with $N_2$ and covered with an oil layer. Into the compartment adjacent to Ox-I yellow leucoindigo carmine was introduced. Then the catalyst system was irradiated from both sides with a 500 Watt halogen lamp through 420 nm cut-off filters. After heating to about 50° C. hydrogen and oxygen developed as evident by the change in color of the yellow leucoindigo carmine to the blue indigo carmine (a sensitive indicator for oxygen).

Experiments employing $D_2O$ and $H_2{}^{18}O$ and using a nitrite solution as filter confirmed the cleavage of water since $D_2$ and higher than naturally occurring quantities of ${}^{16}O{}^{18}O$ were demonstrated by mass spectrometry.

7.2.a Combining Ox-I and Red-II

Both of the catalyst units (slide Ox-I and slide Red-II) produced in Example 1 and Example 5, respectively, comprising the oxidation-promoting first photoactive material $RuS_4$ and the reduction-promoting second photoactive material [(2,2'-bipyridine)[4-(11-acetylsulfanylundecyl)-4'-methyl-2,2'-bipyridine]-ruthenium(II)-[(tetrapyridophenazine)-palladium(II)-dichloro]bis-(hexafluorophosphate), respectively, are bonded together by their non-coated faces and the coated surfaces of the two units are conductively interconnected by a copper conductive adhesive tape (made by PGO Präzisions Glas & Optik GmbH, Im Langen Busch 14, D-58640 Iserlohn, Germany).

7.2.b Irradiating the Catalyst System (Ox-I)-(Red-II)

A catalyst system as made in Section 7.2.a was adhered to a Nafion® membrane and a window was cut into the membrane so that both sides of the system were exposed. The membrane comprising the catalyst system was inserted into a photoreactor so that two compartments were formed. Both compartments were filled in deoxygenized water saturated with $N_2$ and covered with an oil layer. Into the compartment adjacent to Ox-I yellow leucoindigo carmine was introduced. Then the catalyst system was irradiated from both sides with a 500 Watt halogen lamp through 420 nm cut-off filters. After acidifying the compartment adjacent to Red-II with sulfuric acid to a pH value of about 5 at ambient temperature, hydrogen and oxygen developed as evident by the change in color of the yellow leucoindigo carmine to the blue indigo carmine (a sensitive indicator for oxygen).

7.3.a Combining Ox-I and Red-III

Both of the catalyst units (slide Ox-I and slide Red-III) produced in Example 1 and Example 6, respectively, comprising the oxidation-promoting first photoactive material $RuS_4$ and the reduction-promoting second photoactive material platinized $SrTiO_3$ codoped with 2.5% antimony and 2.0% chromium, respectively, are bonded together by their non-coated faces and the coated surfaces of the two units are conductively interconnected by a copper conductive adhesive tape (made by PGO Präzisions Glas & Optik GmbH, Im Langen Busch 14, D-58640 Iserlohn, Germany).

7.3.b Irradiating the Catalyst System (Ox-I)-(Red-III)

A catalyst system as made in Section 7.3.a was adhered to a Nafion® membrane and a window was cut into the membrane so that both sides of the system were exposed. The membrane comprising the catalyst system was inserted into a photoreactor so that two compartments were formed. Both compartments were filled in deoxygenized water saturated with $N_2$ and covered with an oil layer. Into the compartment adjacent to Ox-I yellow leucoindigo carmine was introduced. Then the catalyst system was irradiated from both sides with a 500 Watt halogen lamp through 420 nm cut-off filters. At ambient temperature, hydrogen and oxygen developed as evident by the change in color of the yellow leucoindigo carmine to the blue indigo carmine (a sensitive indicator for oxygen).

7.4.a Combining Ox-II and Red-III

Both of the catalyst units (slide Ox-II and slide Red-III) produced in Example 2 and Example 6, respectively, comprising the oxidation-promoting first photoactive material $WO_3$ (platinized as well as non-platinized) and the reduction-promoting second photoactive material platinized $SrTiO_3$ codoped with 2.5% antimony and 2.0% chromium, respectively, are bonded together by their non-coated faces and the coated surfaces of the two units are conductively interconnected by a copper conductive adhesive tape (made by PGO Präzisions Glas & Optik GmbH, Im Langen Busch 14, D-58640 Iserlohn, Germany).

7.4.b Irradiating the Catalyst System (Ox-II)-(Red-III)

A catalyst system as made in Section 7.4.a was adhered to a Nafion® membrane and a window was cut into the membrane so that both sides of the system were exposed. The membrane comprising the catalyst system was inserted into a photoreactor so that two compartments were formed. Both compartments were filled in deoxygenized water saturated with $N_2$ and covered with an oil layer. Into the compartment adjacent to Ox-I yellow leucoindigo carmine was introduced. Then the catalyst system was irradiated from both sides with a 500 Watt halogen lamp through 420 nm cut-off filters. At ambient temperature, hydrogen and oxygen developed as evident by the change in color of the yellow leucoindigo carmine to the blue indigo carmine (a sensitive indicator for oxygen).

7.5.a Combining Ox-III and Red-III

Both of the catalyst units (slide Ox-III and slide Red-III) produced in Example 3 and Example 6, respectively, comprising the oxidation-promoting first photoactive material $Mn_4O_4(phenyl_2PO_2)$ and the reduction-promoting second photoactive material platinized $SrTiO_3$ codoped with 2.5% antimony and 2.0% chromium, respectively, are bonded together by their non-coated faces and the coated surfaces of the two units are conductively interconnected by a copper conductive adhesive tape (made by PGO Präzisions Glas & Optik GmbH, Im Langen Busch 14, D-58640 Iserlohn, Germany).

7.5.b Irradiating the Catalyst System (Ox-III)-(Red-III)

A catalyst system as made in Section 7.5.a was adhered to a Nafion® membrane and a window was cut into the membrane so that both sides of the system were exposed. The membrane comprising the catalyst system was inserted into a photoreactor so that two compartments were formed. Both compartments were filled in deoxygenized water saturated with $N_2$ and covered with an oil layer. Into the compartment adjacent to Ox-I yellow leucoindigo carmine was introduced. Then the catalyst system was irradiated from both sides with a 500 Watt halogen lamp through 420 nm cut-off filters. At ambient temperature, hydrogen and oxygen developed as evident by the change in color of the yellow leucoindigo carmine to the blue indigo carmine (a sensitive indicator for oxygen).

The entire disclosure of all documents cited in the present application, such as e.g. journal articles, books as well as patents and patent applications, is herein incorporated by reference.

What is claimed is:

1. A monolithic catalyst system for the cleavage of water into hydrogen and oxygen with the aid of light, wherein the catalyst system comprises (a) a first photoactive material which, when irradiated with light having a wavelength≥420 nm, is capable of generating oxygen and protons from water either by itself or together with at least one of an auxiliary material and an auxiliary catalyst, and (b) a second photoactive material which, when irradiated with light having a wavelength≥420 nm, is capable of reducing protons in water to hydrogen either by itself or together with at least one of an auxiliary material and an auxiliary catalyst, (a) and (b) being in electrical contact via (c) one or more electron-conducting materials.

2. The catalyst system of claim 1, wherein the wavelength is ≥450 nm.

3. The catalyst system of claim 1, wherein the system comprises one or more auxiliary materials and/or catalysts which are in association with at least one of (a) and (b).

4. The catalyst system of claim 1, wherein (c) comprises at least one of a metal, a metal alloy, and an oxidic electron-conducting material.

5. The catalyst system of claim 1, wherein the system comprises a substrate.

6. The monolithic catalyst system of claim 1, wherein (a) comprises one or more materials selected from optionally doped oxide- and/or sulphide-containing materials, complexes and clusters comprising at least one of a noble metal and a transition metal, and photoactive polymeric materials.

7. The catalyst system of claim 1, wherein (b) comprises one or more materials selected from metal-containing complexes, organic compounds having an extended π system, oxide and/or oxynitride containing materials, phosphide, arsenide, antimonide, sulphide and/or selenide containing materials, and photosemiconducting polymers.

8. The catalyst system of claim 1, wherein at least one of (a) and (b) is bound to (c) by a functional group.

9. The catalyst system of claim 1, wherein the system comprises a plane multilayer structure, one side of the structure comprising (a) and the other side of the structure comprising (b), or one side of the structure comprising both (a) and (b).

10. A method of generating oxygen and hydrogen from water with the aid of light and a catalyst system, wherein the method comprises contacting a monolithic catalyst system comprising (a) a first photoactive material which, when irradiated with light having a wavelength≥420 nm, is capable of generating oxygen and protons from water either by itself or together with at least one of an auxiliary material and an auxiliary catalyst, and (b) a second photoactive material which, when irradiated with light having a wavelength≥420 nm, is capable of reducing protons in water to hydrogen either by itself or together with at least one of an auxiliary material and an auxiliary catalyst, (a) and (b) being in electrical contact via (c) one or more electron-conducting materials, with water or an aqueous fluid or solution at a first location comprising the first photoactive material or at least one of an auxiliary material and an auxiliary catalyst associated therewith, and at a second location comprising the second photoactive material or at least one of an auxiliary material and an auxiliary catalyst associated therewith, and thereafter irradiating with light the water or aqueous fluid or solution in contact with the first location and the water or aqueous fluid or solution in contact with the second location, the first and second locations being in contact with each other such that protons can migrate from the first location to the second location.

11. The method of claim 10, wherein the light comprises sunlight.

12. The method of claim 10, wherein the first location and the second location are separated from each other by a membrane that is permeable only for protons and water.

13. The method of claim 10, wherein the first location is directly irradiated with light.

14. The method of claim 10, wherein the second location is directly irradiated with light.

15. The method of claim 10, wherein the first location and the second location location are directly irradiated with light.

16. The method of claim 10, wherein at least one of oxygen and hydrogen are collected intermittently or continuously.

* * * * *